United States Patent [19]
Witkovsky et al.

[11] Patent Number: 5,782,136
[45] Date of Patent: Jul. 21, 1998

[54] MOTOR VEHICLE STEERING COLUMN WHICH IS DIVISIBLE INTO MUTUALLY SEPARABLE STRUT PARTS

[75] Inventors: Thomas Witkovsky, Grafenau; Alfred Schnabel, Althengstett; Rolf Zimmerman, Ehningen, all of Germany

[73] Assignee: Mercedes-Benz AG, Germany

[21] Appl. No.: 664,502

[22] Filed: Jun. 17, 1996

[30] Foreign Application Priority Data

Jun. 15, 1995 [DE] Germany ............... 195 21 793.4

[51] Int. Cl.⁶ ........................................ B62D 1/19
[52] U.S. Cl. .................... 74/492; 280/750; 280/777; 280/779
[58] Field of Search ............... 74/492; 280/777, 280/779, 750

[56] References Cited

U.S. PATENT DOCUMENTS 4,432,565  2/1984  Suzuki et al. ............... 280/779
4,655,475  4/1987  Van Gelderen ............ 280/779 X
5,114,182  5/1992  Thull et al. ............... 280/779

FOREIGN PATENT DOCUMENTS 1731670  5/1992  U.S.S.R. ............... 280/777

Primary Examiner—Allan D. Herrmann
Attorney, Agent, or Firm—Evenson, McKeown, Edwards & Lenahan, P.L.L.C.

[57] ABSTRACT

A steering column for a motor vehicle comprises struts as a support of the steering column tube on vehicle parts. At least one of these struts extends in the transverse direction of the vehicle. On at least one transversely extending strut, at least one separating point is constructed by way of which, in the event of a crash load, the strut can be divided into mutually separated strut parts. During a crash, an unfavorable movement of the steering column tube is therefore prevented.

8 Claims, 1 Drawing Sheet

MOTOR VEHICLE STEERING COLUMN WHICH IS DIVISIBLE INTO MUTUALLY SEPARABLE STRUT PARTS

BACKGROUND AND SUMMARY OF THE INVENTION

The present invention relates to a steering column for a motor vehicle, and more particularly to a steering column having struts for supporting the steering column tube on vehicle supporting parts, with at least one of the struts extending in the transverse direction of the motor vehicle.

DE 30 04 797 A1 describes a motor vehicle steering column having two struts extending at a right angle with respect to one another for supporting the steering column tube on vehicle supporting parts. One of these struts points in the transverse direction of the vehicle to the vehicle side and yields in a bending, non-rigid manner in the event of a high crash load. When the vehicle deforms during a crash, this strut, which extends in the transverse direction of the vehicle, can, as an obstacle, hinder the displacement of the pedals. As a result, by way of the strut, these will then have a swivelling effect on the steering column tube and may change the position of the steering wheel to a position which is unfavorable for the occupant.

DE 34 27 211 C1 describes a safety steering column for motor vehicles which comprises a strut connecting the steering column with the vehicle body. This strut has two parallel-extending and interacting connection members. One of the connecting members is burst in the case of a crash load and then permits a bending of the other connection member. A complete separation into at least two strut parts does not take place in this case.

DE 32 45 741 C2 describes a steering column is described whose steering column tube is supported by way of a strut extending in the longitudinal direction of the vehicle on a crash-resistant vehicle part. In the event of a crash with a severe forward structure deformation, the strut is deformed by a transverse member and then leads to a flatter-positioned steering column tube and therefore to a lowered steering wheel. A strut which extends transversely in the vehicle, despite the possible bending, is more likely, however, to hinder the displacement of an interior part which will then act upon the steering column tube by way of the strut and will displace this steering column tube into an unwanted position It is an object of the present invention to prevent, during a crash, in a motor vehicle steering column an unfavorable movement of the steering column tube.

This object has been achieved in accordance with the present invention by providing that, on a transversely extending strut, at least one separating point is formed to divide the strut into mutually separated strut parts when stressed by the crash event.

By way of one strut or several struts, the steering column tube is supported in the normal driving operation. For a crash event in which a transversely extending strut is acted upon, a targeted separation of this strut is provided so that, as a result of the effect on the strut, no displacement of the steering column tube can be caused into a position which is unfavorable for the vehicle occupant. The separating point on the strut is adapted in its resistance to a separation to the desired or necessary load limit which is determined by crash tests so that it can maintain its supporting effect up to a limit value.

The separating point can be prepared for a local stressing by an interior part or unit pushed against it during the crash, or can separate automatically in the event of bending thereof caused by axially or radially acting forces starting at a defined load or angling.

A weakening of the strut area to be separated can take place on a one-piece strut or may be achieved by a connection piece joined to the strut or inserted into it. In this case, as the separating point can be a material structure which differs from the remaining strut or a desired breaking point in the material, for example, by means of notches or perforations. Furthermore, the strut can have a constructive form at this point which breaks in the event of this stress.

Another embodiment of the present invention provides an additional strut piece in which the same weakening possibilities can be provided with respect to the adjoining strut pieces. The connection section to the strut can also form the separating point. Thus, the additional strut piece is held in an overlapping manner on the strut, for example, engaging in a strut receiving device, in which case this overlapping may be canceled by the bending of the strut. Furthermore, the additional strut piece can also be glued on, with the glued connection, additionally acting as a corrosion-preventing insulation between the different strut materials.

Such a strut will be particularly helpful if the strut which, because of its function, extends in the transverse direction of the vehicle and which blocks the displacement path of the interior parts or units situated there which are displaced during the crash in the vehicle direction, can open up the displacement path because of this separating operation.

Other objects, advantages and novel features of the present invention will become apparent from the following detailed description of the invention when considered in conjunction with the accompanying drawings.

DETAILED DESCRIPTION OF THE DRAWINGS

Figure 1:
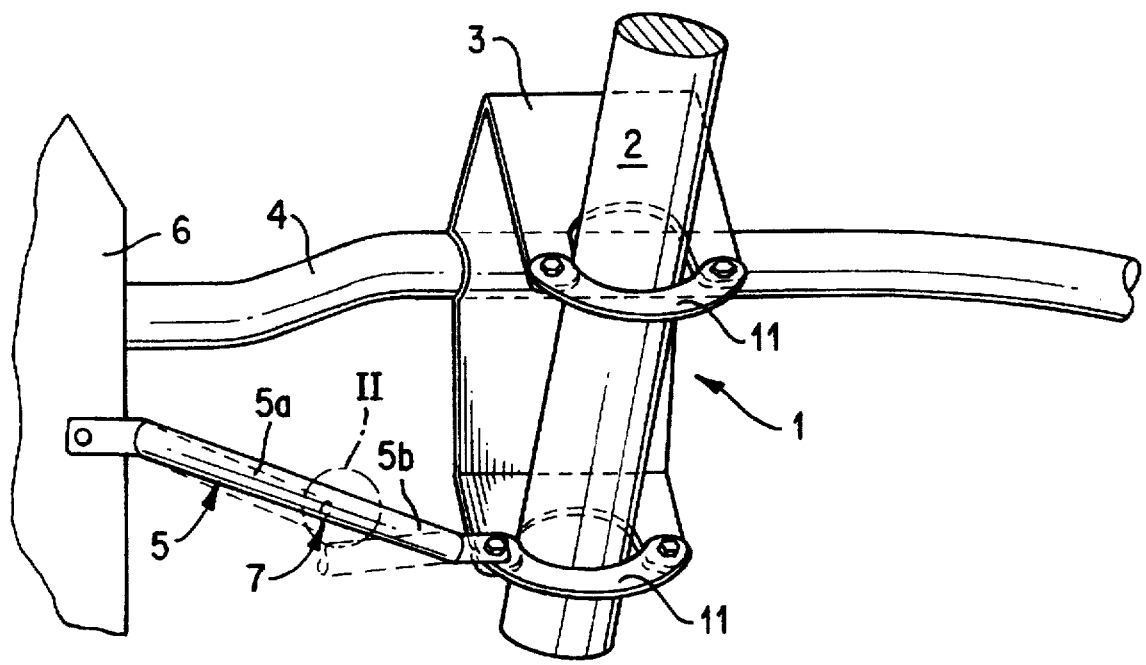
FIG. 1 is a perspective partial view of a section of a steering column, with a transversely extending strut from the steering column tube to a vehicle column.

FIG. 1 is a perspective view of a section of a motor vehicle steering column designated generally by numeral 1 in which a steering column tube 2 is disposed in a sheet metal console 3 which is fixed in a transverse member 4 of the vehicle. The steering column tube 2 is screwed firmly to the sheet metal console 3 by clamps 11. In addition, the steering column tube 2 is supported on a lateral vehicle column or wall 6 by a strut 5 which extends in the transverse direction of the vehicle and is fastened on the sheet metal console 3. As a result, disturbing vibrating motions of the steering column tube 2 can be eliminated.

Because the strut 5 extends transversely on the edge of the leg room, in the event of a crash, when the forward structure is compressed, although the pedal arrangement is pushed past the steering column tube 2, it is pressed against this strut 5. So that the strut 5 will then not pull the steering column tube 2 along with it and swivel it unfavorably for the vehicle occupant, a separating point 7 is constructed on the strut 5 in which the strut can be divided into several strut parts 5a, 5b in the case of a correspondingly high stress during a crash as seen by the dashed.

The separating point 7 is outlined in FIG. 1. This can be a weak point in the strut 5 which may, for example, have a material structure which, by having been treated by way of a metallurgical process, has a higher brittleness than the remaining strut. Furthermore, at this separable point 7 in the material, a desired breaking point may be constructed in the form of notches or perforations and a constructive shaping may be provided which is easier to break.

Figure 2:
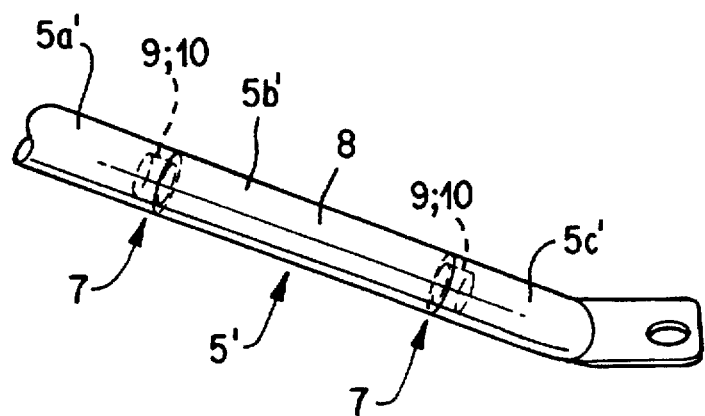
FIG. 2 is a view of another embodiment of a strut in accordance with the present invention.

An additional strut piece 8 may also have the same characteristics, as illustrated in FIG. 2, and is inserted into the strut 5' or can be joined to one end. This strut piece 8 forms the separating point 7 in that, by way of its two ends 9 having a reduced diameter, it is disposed to be inserted into respective receiving devices 10 of the strut 5'. When the strut 5' is bent, the strut piece 8 is pulled out of the strut 5', whereby three separate strut parts 5a', 5b', 5c' are created. In another embodiment, the strut piece 8 can also be glued to the strut 5', in which case the adhesive layer will then form a corrosion-preventing separating point between the strut material and a strut piece material which differs from it. For the simple construction of this embodiment, a tube-shaped strut cross-section may, however, also be used without departing from the scope of the present invention.

In the above-described embodiments involving an additional strut piece, when being bent correspondingly as a result of a crash load, the strut 5' is divided into the strut parts 5a, 5b, 5c or 5a', 5b', 5c' and will then open up the path for a displacement of an interior part or of a unit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A steering column for a motor vehicle, comprising a single strut for supporting the steering column tube on vehicle supporting parts and extending in a transverse direction of the motor vehicle from one side of the steering column tube to a lateral wall of the vehicle, wherein the transversely extending strut has at least one separating point formed thereon between the steering column tube and the lateral wall so as to divide the strut from a single part into mutually separated strut parts only after being stressed and separated by a crash and thereby not pull the steering column tube into an unfavorable position for a vehicle occupant.

2. The steering column according to claim 1, wherein the strut is configured to be automatically separated in the event of a predetermined stress.

3. The steering column according to claim 1, wherein a strut piece is inserted in or joined to the strut at the at least one separating point.

4. The steering column according to claim 3, wherein the strut piece is glued to the strut.

5. The steering column according to claim 3, wherein at least one end of the strut piece is configured to be releasably inserted in a overlapping manner in a receiving device on the strut.

6. The steering column according to claim 1, wherein the strut is configured as a tube.

7. The steering column according to claim 1, wherein the separating point comprises a material structure which differs from adjoining areas of the strut.

8. The steering column according to claim 1, wherein the separating point is configured as a constructively developed desired breaking point.

* * * * *